3,480,332
USE OF WATER TO IMPROVE SEPARATION OF SOLIDS FROM SLURRIES WITH OIL
Calvin J. Kuhre, Kensington, and Ronald K. June, Pleasant Hill, Calif., assignors to Shell Oil Company, New York, N.Y., a corporation of Delaware
Filed July 19, 1967, Ser. No. 654,416
Int. Cl. B65g 53/04
U.S. Cl. 302—66                        15 Claims

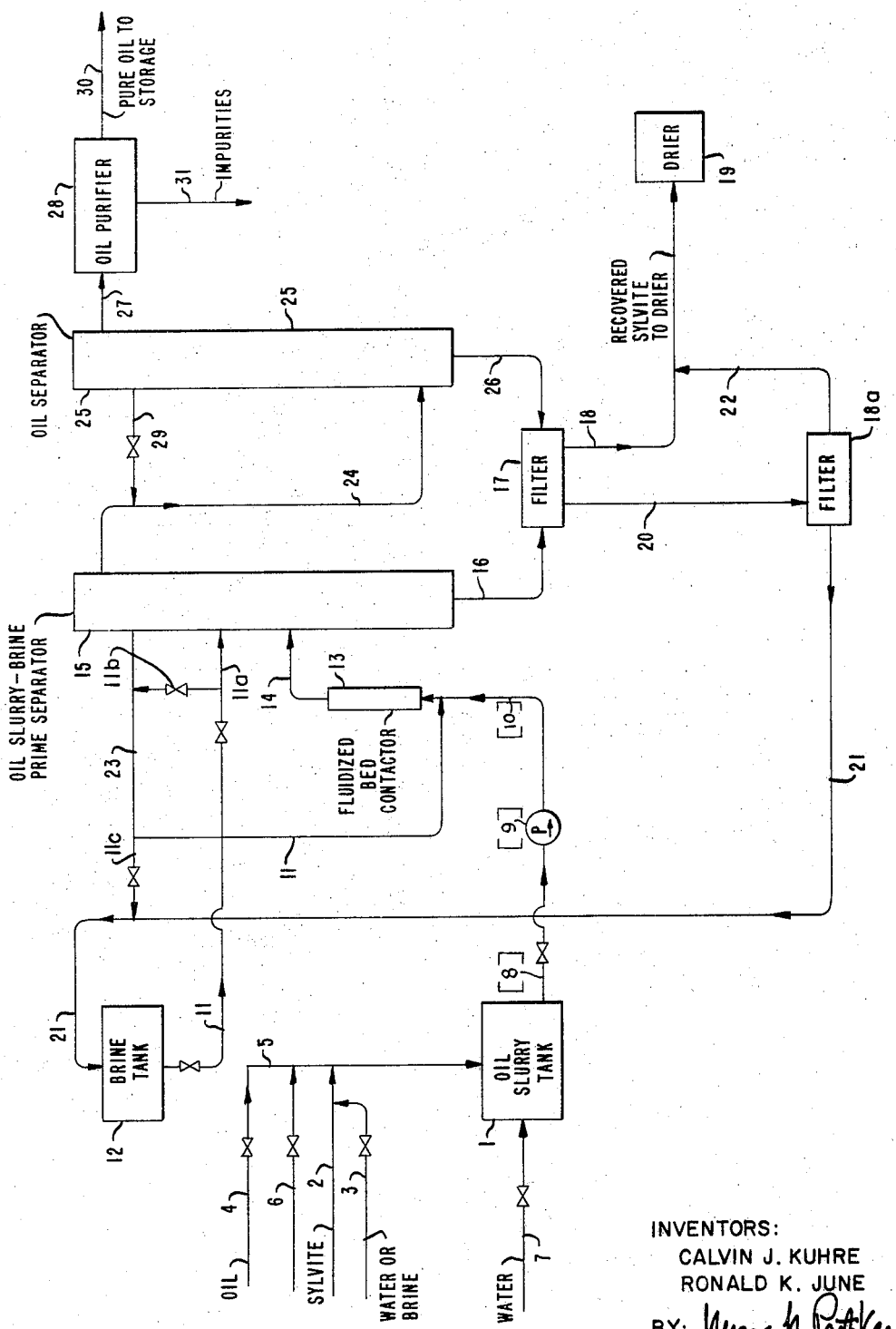

ABSTRACT OF THE DISCLOSURE

An improved method of recovering water-soluble solid particles from an oil slurry by contacting the oil slurry with an aqueous solution of an electrolyte comprising treating the water-soluble solid particles with a small amount of an aqueous solution prior to, during or after the formation of the oil slurry.

---

This invention relates to an improved method for recovery of water-soluble solids such as inorganic minerals from an oil slurry. More particularly, the present invention is directed to recovery of water-soluble inorganic salts from hydrocarbon oils in which said salts are dispersed therein as a slurry and which on recovery the salts are essentially free of oil and the oil is free of salts.

BACKGROUND OF THE INVENTION

Water-soluble solids can be conveniently and economically transported over great distances through pipelines as oil slurries, which slurries can contain from 1–50% or more of water-soluble solid material in particle form dispersed in a suitable liquid hydrocarbon carrier such as crude oil or fractions thereof ranging in viscosity from light petroleum fractions in the kerosene boiling range to highly viscous oils approaching the viscosity of a heavy crude oil. The water-soluble solid particles are dispersed by suitable means and may have a particle size ranging from less than 50 microns to above 5000 microns and generally are in the range of from 75 to 3000 and preferably are between 200 and 1500 microns.

Various techniques have been proposed for recovery of water-soluble solid particles such as alkali metal salts or various other alkali compounds, e.g., potassium chloride, potash, potash salts, sodium chloride, muriate of potash (sylvite), soda ash, sodium sulfate, phosphate rock and the like, as well as various fertilizer material from a liquid hydrocarbon carrier, such as by settling, or precipitation, or phase transfer and the like, which methods are described in copending applications Ser. No. 366,870, filed May 12, 1964, and which matured as U.S. Patent 3,365,-229 on Mar. 23, 1968 or Ser. No. 465,445, filed June 21, 1965, and which matured as U.S. Patent 3,368,876 on Feb. 13, 1968.

Some of these techniques, however, have drawbacks such as poor separation; they are time consuming and the separated products contain impurities which must be removed before either the solids or liquid can be considered as acceptable recovered products. Thus, using settling or precipitation techniques to recover solids such as sylvite from oil, the process is time consuming and ineffective in producing pure products of acceptable standards. The use of normal phase-transfer techniques generally results in a formation of an emulsion interface which inhibits or interferes with the effective recovery of the solids. The solid products then contain substantial amounts of entrapped oil which presents a costly purification problem. The recovered oil phase also contains solid impurities which must be removed from the oil.

It is an object of the present invention to effectively separate and recover essentially oil-free water-soluble solids from an oil slurry.

Still another object of the present invention is to prepare an oil slurry containing a substantial amount of water-soluble solids dispersed therein for pipeline transportation and recovery of oil-free water-soluble solids at the terminal end of the pipeline by a novel phase transfer technique.

Still another object of the present invention is to prepare an oil slurry containing a water-soluble solid such as an inorganic salt and thereafter recovering the salt by phase transfer so that the salt is essentially free of oil and the oil free of the salt.

These and other objects will be apparent from the following description of the invention.

SUMMARY OF THE INVENTION

The present invention is directed to an improved novel and new technique for preparing a water-soluble solid-hydrocarbon slurry for pipeline transportation and recovering said slurry at the terminal station of the pipeline so that the solid material is essentially or wholly hydrocarbon free and the hydrocarbon, e.g., petroleum oil, is free of solids, by contacting the slurry with an aqueous solution containing an electrolyte which may be a saturated solution to effect a phase transfer of the solids from the hydrocarbon phase into the aqueous phase and thereafter separating the solids from the aqueous solution by conventional means. The essence of the present invention resides in either prior to, during or after the formation of the slurry of the water-soluble solid particles in a hydrocarbon carrier to admix therewith a small amount of an aqueous solution, e.g., water or brine, so that the slurried liquid hydrocarbon composition contains from a fraction of a percent to about 5% of water or brine and preferably between about 1% and about 4% water or brine based on the total solid material in the oil slurry composition. The preferred method is to pretreat the water-soluble solid material with from about 2% to about 4% water or brine and thereafter slurrying the water-soluble solid material with a liquid hydrocarbon such as a petroleum crude oil or fractions thereof. However, the water-soluble solid material can be slurried with oil and the required amount of water can be added during or after the slurry has been formulated.

By addition of a small amount of water or brine to either the water-soluble solid particles prior to slurrying with oil or to an oil slurry containing water-soluble solid particles, recovery of these particles is greatly facilitated when phase transferred into an electrolytic aqueous solution which may be saturated without encountering emulsion and separation difficulties and no special equipment or flow techniques are required to accomplish the separation and recovery of the solid particles from the aqueous phase. Thus, by pretreating the oil slurry in the manner described, the slurry and aqueous solution can be contacted under laminar or turbulent flow conditions in order to effect transfer of the solid material from the oil phase into the aqueous phase so that in the end of the separation of the two phases, the oil is free of water-soluble solid material and the water-soluble solid material recovered by suitable means from the aqueous electrolytic solution is oil free. Not only is effective separation of the water-soluble solid particles from the oil into the aqueous phase efficiently accomplished by pretreating the solid particles with a small amount of water or brine prior to, during or after slurrying the solid particles with oil and thereafter contacting said slurry with the aqueous solution, but the particle size of the solids are not diminished due to attrition to unacceptably small particle size due to flow conditions encountered in conventional pipeline transportation and recovery of the solids from the oil slurry. Also, the use of demulsifiers normally used to break or prevent the formation of an interface emulsion can be avoided when using the process of the present invention thereby making it both more economical and more efficient.

The water-soluble solid particle-oil slurry, such as a slurry of sylvite-crude oil, can contain from 1% to 75% or more percent by volume (and preferably from 20% to 50%) of the solid particles (50–5000 microns, preferably between 200 and 1500 microns) suspended or dispersed in the oil and the slurry can be prepared by any suitable means and which also contains from a fraction of a percent to about 5% water or brine by weight. The water- or brine-containing oil slurry is stable for transportation through pipelines over long distances.

The electrolytic aqueous fluid used in the process of the present invention can be a saturated or unsaturated water solution containing an inorganic electrolyte such as one of the alkali metal chlorides, nitrates, sulfates or the like and mixtures thereof of which the preferred is a saturated brine.

Under certain circumstances it may be desirable that the pH of the aqueous fluid be within the range of from 7–12 and preferably between 8–10. By controlling the pH of the aqueous solution within this range, it has been observed that by the phase transfer of the solid particles such as sylvite from the oil phase into the aqueous phase is more easily and completely accomplished than when using a neutral or acidic aqueous fluid. Thus, to effect better separation the aqueous pretreated fluid or the aqueous fluid used to effect the separation of the solid (sylvite) from the oil phase into the aqueous phase, may contain a small amount of a basic material such as alkali metal hydroxide so as to effect an adjustment in the pH of the aqueous fluid to be within the range indicated.

DESCRIPTION OF THE PREFERRED EMBODIMENTS

According to the invention, water-soluble solid particles are pretreated before, during or after being oil slurried with a small amount of water (1–5%) and the water-modified oil slurry is brought into intimate laminar or turbulent flow contact with a saturated or unsaturated brine solution, thereby causing the transfer of the solid material from the oil slurry to the brine phase; the latter phase is thereafter separated from the oil, e.g., by settling or centrifuging or other suitable means and finally the solids are recovered from the brine. Brine is admixed with the slurry stream under any contacting or flow conditions for a time sufficient to effect essential, complete phase transfer of the water-soluble solid material from the oil phase to the brine phase from where the solid material is separated and is then removed by suitable means, e.g., thickening, settling, centrifuging or filtration or a combination of these.

The residual brine may, in continuous operations, be returned to the oil-contacting step for the treatment of additional oil slurry.

When the oil slurry containing the small amount of water is brought into contact with the brine under conditions described, the solids from the oil slurry readily pass into the brine phase and are removed therefrom by suitable means. The brine may consist of water in which is dissolved the same material as that being recovered from the oil slurry, although other water-soluble solutes or electrolytes may be used. The brine is advantageously saturated so that the preferentially wetted material will not dissolve, although water may be added to dissolve some of the solid if brine is wanted as a product. The solid material recovered from the brine is substantially free from oil and subsequent washing is not necessary or a light wash is sufficient. The recovered solid material is readily dried by heating. The material may be reconstituted into crystals of desired size if not in proper physical form.

A preferred aqueous fluid useful for pretreatment of the solid material such as sylvite as well as to effect separation of an oil slurry containing said solid material may be a saturated aqueous KCl brine made from sylvite having a pH of about 8–10, preferably between about 8.5–9.5. Brine for pretreatment having the pH indicated may be obtained by adding between 0.5 and 0.7% w. of KOH and such a solution may also be used to effect phase transfer of a sylvite oil slurry in the manner of the present invention.

The invention is not limited to the treatment of oil slurries which contain dispersed particles of any particular size or range of sizes. However, it is most effective when applied to particles larger than 50 microns. Typically, the particles having diameters between 50 and 3500 (200–1500) microns and sizes up to 4000 and higher may be effectively recovered. Often fine particles are deliberately added to an oil slurry formed of larger particles to hinder settling of the latter. In such case, the finest particles are not completely transferred to the brine phase and the oil is subjected to an after-treatment such as washing with hot water; this may be followed by precipitation as noted above. The fine particles thus washed from the oil are in solution, forming a brine, and may therefore be added to the brine in the system. However, some or all of this solution may be discharged, as when the inventory of brine would otherwise become too large or when it contains impurities which are to be discharged.

It is desirable to cause as little oil as possible to be carried over into the brine phase. To this purpose the brine may be heated to above ambient temperature, for example 150° to 200° F.; higher temperatures, such as 300° F., may be used but require pressurized equipment. However, heating is feasible only with certain water-soluble materials. Thus, it was found that in some instances, in which impurities were present in the oil-slurried material, contacting with hot brine resulted in the formation in the oil phase of material which is sometimes difficult to remove. When heated brine is used, it need not be saturated at the elevated temperature, it being sufficient that it be saturated at the temperature at which the material is recovered from the brine. As a specific example, brine saturated at 85° F. may be heated to 200° F. and brought into contact with the oil to reduce the amount of oil carried into the brine and thereafter settled at 85° F.

BRIEF DESCRIPTION OF THE DRAWINGS

The invention will be further described with reference to the accompanying drawing forming a part of this specification, the single view of which is a flow diagram of an illustrative embodiment.

Referring to the drawing, a slurry such as a sylvite (technical KCl) oil slurry (40–60% weight KCl) containing 1–5% weight water was prepared and introduced into vessel 1 by admixing sylvite coming from line 2 with water or brine from valved line 3 or admixing sylvite from line 2 with oil coming from line 4 and introducing water or brine into the oil slurry into line 5 from valved line 6 or into the slurry tank 1 via valved line 7. The water-containing solid-oil slurry formed in tank 1 is conducted via valved line 8 through pump 9 into line 10 which is in communication with valved line 11 which is connected to brine tank 12. The brine-oil slurry is conducted through a fluidized bed or phase contactor 13 and the mixture conducted via line 14 into separator or settler 15 where the oil and the sylvite-brine solution are separated. The sylvite-brine solution is removed from the separator via line 16 and conducted into filter 17 where the sylvite is removed through line 18 and the brine pumped into line 20 from which the brine is removed via line 21 and conducted into the brine vessel 12 and the sylvite conducted via line 22 into line 18 and drier 19. A portion of the brine from separator 15 can be recycled via valved line 23 and line 11 or, if necessary, brine from tank 12 can be introduced in the separator 15 via valved lines 11 and 11a or brine from lines 11 and 11a or introduced into line 23 via lines 11 and 11b. Also, the brine from line 23 can be recycled into line 11 or returned to the brine vessel 12 via lines 11c and 21. The oil from separator 15 can be conducted therefrom if necessary via line 24 into separator 25 where entrained brine is removed via line 26 and returned to filter 17 and oil recovered therefrom via line 27 is purified in purifier 28 and pure oil removed via line 30 to storage and impurities removed via line 31. If necessary, a portion of the oil is recycled via valved line 29.

The reconstitution, drying and classifying of sylvite by the process of this invention is advantageous since in pipeline transportation of sylvite small particles are required to make a stable slurry for pumping through a pipeline. The recovered particles must be reconstituted for commercial use. This includes prilling, flaking, roll compaction, crystallization, agglomeration, etc. A preferred method is agglomeration of the mud by drying.

Moistened salts (mud) can often be agglomerated into spherical pellets on an inclined rotary drum or pan. The size of the pellets is dependent largely on the moisture content of the mud. The agglomerated mud can be dried in an oven to produce reasonably hard and strong pellets. Of the various techniques for making large particles, the agglomeration of the mud appeared to be the most desirable for use in connection with the phase transfer method of separating the slurry using laminar flow techniques of the present invention.

Thus, the sylvite mud recovered from filters 17 and 18 can be agglomerated quite readily. The mud from these filters can be placed on a belt, dried and crushed to produce rough-edged agglomerates. When the mud is cast into forms, it can be recovered in almost any shape and size desired. The mud can be tumbled in rotary driers to yield particles ranging from marble-like spheres to small pellets. Reconstitution of the solids into pellets (granules, nodules, etc.) for fertilizer use is desirable. Pellets have inherent strength due to shape, show good dry flow characteristics (flow easily when handled by mechanical equipment), and resist segregation when mixed with other pelletized fertilizer ingredients. Furthermore, pellets allow the incorporation of other nutrients therein so as to produce a balanced fertilizer.

The addition of small amounts of certain salts has been found desirable to increase the hardness (resistance to attrition) of sylvite agglomerates. The added salts can be also plant nutrients and may be added in the quantities required to yield balanced fertilizers. Salts found to harden sylvite are diammonium phosphate $(NH_4)_2HPO_4$, ammonium sulfate $(NH_4)_2SO_4$, calcium phosphate $$Ca_3(PO_4)_2$$

ammonium nitrate $NH_4NO_3$, potassium sulfate $K_2SO_4$ and potassium phosphate $K_3PO_4$ and the like.

Tables 1–3 show the results of tests of salt-hardened sylvite agglomerates recovered from an oil slurry by the phase transfer process of the present invention.

TABLE 1.—RESISTANCE TO ATTRITION OF SYLVITE AGGLOMERATES [1] HARDENED WITH SALTS

| Salt Added and Concentration (percent weight basis dry cake) | Sieve Time, minutes | Material Remaining on #12 Sieve, percent weight |
|---|---|---|
| No salt added, control | 30 | 42.9 |
|  | 60 | 19.3 |
| $(NH_4)_2HPO_4$ Diammonium phosphate: |  |  |
| 0.1 | 30 | 80.8 |
| 0.1 | 60 | 65.5 |
| 0.3 | 30 | 84.0 |
| 0.3 | 60 | 78.2 |
| 30.0 | 30 | 92.3 |
| 30.0 | 60 | 85.2 |
| $(NH_4)_2SO_4$ Ammonium sulfate: |  |  |
| 0.3 | 30 | 59.1 |
| 0.3 | 60 | 35.5 |
| 1.7 | 30 | 78.8 |
| $Ca_3(PO_4)_2$, 0.3 | 30 | 58.8 |
| Calcium phosphate, 1.7 | 30 | 78.1 |

[1] The agglomerates were short cylinders 2 inches in diameter and ¾ inch thick and contained about 1% weight oil. The attrition test was similar to a method used by Potash Company of America. The agglomerates were placed in a W. S. Taylor Ro-Tap sieve shaker for the indicated period of time and the amount of material retained on the sieve was measured.

TABLE 2.—RESISTANCE TO ATTRITION OF SYLVITE AGGLOMERATES [1] HARDENED WITH 1% WEIGHT SALT
[Sieve time—30 minutes]

| Salt Added | Material Remaining on #12 Sieve, percent weight |
|---|---|
| No salt added (control) | 64.2 |
| $NH_4NO_3$ | 80.1 |
| $K_2SO_4$ | 83.0 |
| $K_3PO_4$ | 71.5 |

[1] The agglomerates were short cylinders 1½ inches in diameter and ¾ inch thick (no oil was present). The attrition test was similar to a method used by Potash Company of America. The agglomerates were placed in a W. S. Taylor Ro-Tap sieve shaker for the indicated period of time and the amount of material retained on the sieve was measured.

TABLE 3.—ATTRITION TEST [1] OF 8- TO 16-MESH SYLVITE PELLETS

| | Material Retained on Sieve, percent weight | | | |
|---|---|---|---|---|
| | 16 | 35 | 100 | −100 |
| Diammonium Phosphate Added, percent weight: | | | | |
| 0 | 33.8 | 32.0 | 32.0 | 2.2 |
| 0.5 | 75.5 | 14.9 | 7.4 | 2.2 |
| 1.0 | 79.6 | 13.5 | 4.9 | 2.0 |
| 3.0 | 77.4 | 17.1 | 4.3 | 1.2 |
| Sylvite Crystals (8–16 mesh) | 82.6 | 15.2 | 1.4 | 0.8 |

[1] Attrition test consisted of rotating 50 grams of 8- to 16-mesh pellets and 25½ inch porcelain balls (85 grams) in a 1-liter ball mill jar for 5 minutes at 105 r.p.m. followed by sieving.

The sylvite pellets containing the hardener compare favorably with the KCl crystal alone, not only from the standpoint of their resistance to attrition as a whole (material retained on 16-mesh sieve) but also in the amount of fines formed (material passing through the 100-mesh sieve).

The greatest effect of diammonium phosphate in increasing the hardness of sylvite agglomerates and pellets (Tables 1 and 3) was found to occur at relatively low concentrations of the salt (less than 0.5% weight). Thereafter, the addition of increasing amounts of the hardener did little to improve the hardness of the sylvite.

Other plant nutrients that may be added to sylvite mud not only to produce a balanced fertilizer but to control the physical properties include sulfur and urea. When small pellets are made, these compounds, added either separately or together to the sylvite mud, harden the subsequent pellets by the formation of a hard outer shell. This shell is obtained by the glazing of the dried pellets in a hot zone at short residence times, such that the sulfur and/or urea are fused only on the surface.

The invention is further illustrated by the following example.

Sylvite was pretreated with 2% saturated KCl brine and thereafter slurried with oil to form a 40% sylvite-oil slurry. The slurry was contacted under turbulent flow conditions with brine in the ratio of about 1:1. Thereafter the mixture was allowed to separate into an oil phase and brine phase which contained essentially all of the sylvite therein. The sylvite was recovered from the brine phase by filtration, dried and the recovered sylvite contained about 0.08% oil. The oil phase contained about 0.78% brine. The process was repeated in which the oil slurry was formed without pretreating it with 2% saturated KCl brine and on similar phase separation the sylvite contained 0.67% oil and the oil contained 1.73% brine. These figures illustrate the significance of the presence of a small amount of brine in the oil slurry so as to obtain both pure sylvite and oil product by the process of the present invention.

The foregoing description of the invention is merely intended to be explanatory thereof. Various changes in the details of the method may be made, within the scope of the appended claims, without departing from the spirit of the invention.

We claim as our invention:

1. A method of transportation through a pipeline over a great distance a slurry of water-soluble solid particles and recovering at the terminal end of the pipeline the water-soluble solid particles from an oil slurry comprising:
   contacting from about 20% to about 75% of water-soluble solid particles with from a fraction of one percent to about 5% of an aqueous solution and thereafter slurrying the mixture with oil;
   transporting the slurry to a terminal station and removing the slurry therefore, by introducing the slurry into a separator;
   contacting in the separator the slurry with a saturated aqueous solution containing an electrolyte to effect phase transfer of the water-soluble solid particles from the oil phase to the aqueous phase;
   separating the two phases; and
   recovering the water-soluble particles from the electrolytic saturated aqueous phase.

2. The method of claim 1 wherein the water-soluble solid particles are alkali metal salts and the saturated aqueous electrolyte solution is saturated brine.

3. The method of claim 1 wherein brine is added to the water-soluble solid particles and oil as the mixture is slurried.

4. The method of claim 1 wherein the contacting of the oil-solid particle slurry with the aqueous electrolyte solution is done by means of afluidized bed contactor.

5. The method of claim 1 wherein the water-soluble solid particles are sylvite particles, the oil slurry contains at least 40% of said sylvite and the saturated aqueous electrolyte solution is saturated brine.

6. The method of claim 5 wherein a hardening material is added to the sylvite particles.

7. The method of claim 6 wherein the hardening agent is selected from the group consisting of diammonium phosphate, ammonium phosphate, ammonium sulfate and calcium phosphate.

8. The method of claim 1 wherein the water-soluble solid particles prior to being slurried with oil are pretreated with from 1–5% water.

9. The method of claim 8 wherein the solid particles are sylvite particles.

10. The method of claim 1 wherein the water-soluble solid particles prior to being slurried with oil are pretreated with from 1–5% saturated brine.

11. The method of claim 10 wherein the solid particles are sylvite particles.

12. The method of claim 1 wherein brine is added to the water-soluble solid particles and oil after the mixture is slurried.

13. The method of claim 12 wherein the particles are sylvite.

14. The method of claim 1 wherein the contacting of the oil-solid particle slurry with the aqueous electrolyte solution is done by means of a phase contactor.

15. The method of claim 14 wherein the solid particle is sylvite particles and the aqueous electrolytic solution is a brine solution.

References Cited

UNITED STATES PATENTS

| | | | |
|---|---|---|---|
| 2,140,574 | 12/1938 | Cerf | 208—284 X |
| 2,446,040 | 7/1948 | Blair | 208—298 X |
| 3,378,363 | 4/1968 | Titus | 23—300 X |

MICHAEL E. ROGERS, Primary Examiner

U.S. Cl. X.R.

23—300, 312; 71—64; 210—21